United States Patent [19]

Simonis

[11] Patent Number: 5,664,757

[45] Date of Patent: Sep. 9, 1997

[54] STAND FOR RECEIVING MACHINES AND EQUIPMENT

[75] Inventor: Gerhard Simonis, Bremen, Germany

[73] Assignee: ABB Patent GmbH, Mannheim, Germany

[21] Appl. No.: 314,899

[22] Filed: Sep. 29, 1994

[30] Foreign Application Priority Data

Sep. 29, 1993 [DE] Germany .......................... 43 33 048.7

[51] Int. Cl.[6] .................................................. F16M 1/00
[52] U.S. Cl. .......................... 248/672; 248/676; 248/188; 211/26; 211/189
[58] Field of Search .................................. 248/672, 676, 248/680, 188, 159; 403/217, 218, 219, 170, 159; 52/655.1, 655.2; 211/26, 189

[56] References Cited

U.S. PATENT DOCUMENTS

| 4,271,654 | 6/1981 | Jungbluth | 52/655.1 |
| 5,259,684 | 11/1993 | Schärer | 403/174 |
| 5,473,852 | 12/1995 | Lindsey | 52/655.2 |

FOREIGN PATENT DOCUMENTS

| 7408192 | 1/1975 | Germany | 403/170 |
| 29 02 307 | 7/1980 | Germany . | |
| 86 22 738.6 | 2/1988 | Germany . | |

*Primary Examiner*—Leslie A. Braun
*Assistant Examiner*—Gwendolyn W. Baxter
*Attorney, Agent, or Firm*—Herbert L. Lerner; Laurence A. Greenberg

[57] ABSTRACT

A stand for receiving machines and equipment includes horizontally and vertically extending beams being constructed as hollow profile sections. Cup-shaped junction nodes are disposed in a plurality of planes. Each of the junction nodes have a given side facing a respective one of the beams and is form-lockingly connected with the respective beam. Cylindrical pins are embedded into the junction nodes. Each of the pins project from the given side of a respective one of the junction nodes by a predetermined amount and engage in a corresponding recess formed in the respective beam. Connecting rods each pass through a respective one of the beams and have an end with an end surface and a thread. The end surfaces of the connecting rods are each spaced apart from a respective one of the junction nodes defining a gap therebetween. Screw connections are each disposed between a respective one of the connecting rods and a respective one of the junction nodes.

4 Claims, 4 Drawing Sheets

Fig.2
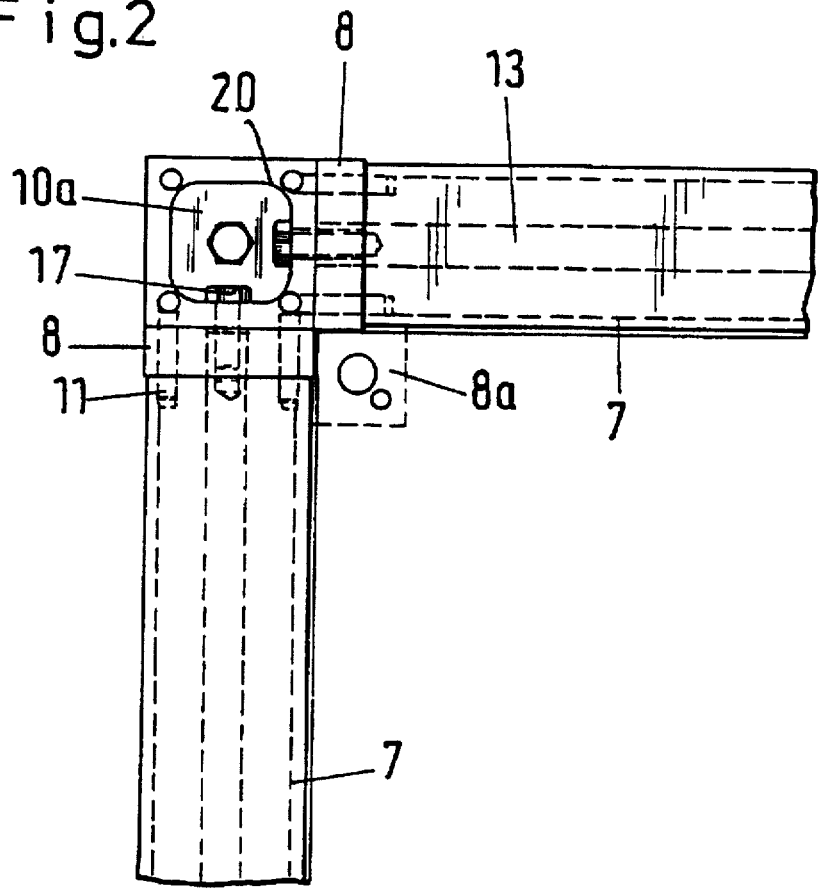
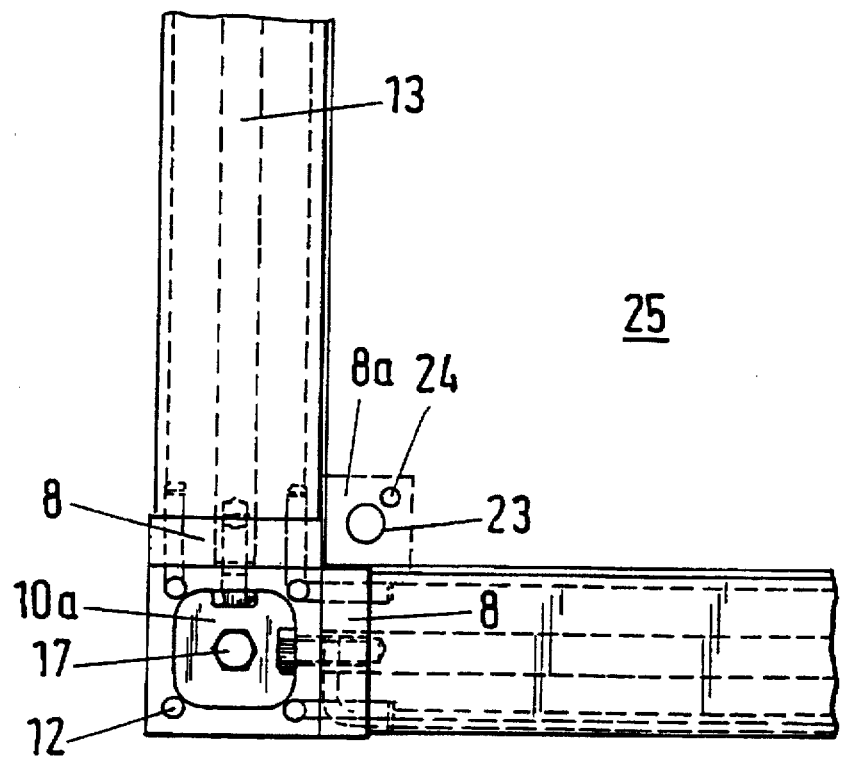

1

STAND FOR RECEIVING MACHINES AND EQUIPMENT

BACKGROUND OF THE INVENTION

1. Field of the Invention

The invention relates to a stand for receiving machines and equipment, including horizontally and vertically extending beams constructed as hollow profile sections, and junction nodes being disposed in a plurality of planes and with which the beams enter into a form-locking connection. A form-locking connection is one which connects two elements together due to the shape of the elements themselves, as opposed to a force-locking connection, which locks the elements together by force external to the elements.

One such stand is known from German Utility Model DE 92 12 546 U1. In that device, in order to produce the form-locking connection, the lateral surfaces of the cube-shaped junction node have protuberances adapted to the cross section of the inner peripheral surface of the beam. Each lateral surface of the junction node is also provided with apertures, which are constructed as a polygon or a T-groove, for receiving a connecting strap, which is fixed relative to the junction node by a transverse pin. The connecting strap protrudes with its free end into the interior of the beam and is fixed with a clamping screw that passes through the connecting strap and the beam wall.

Multiple-part clamping elements are associated with the clamping screw and by radial displacement they are intended to effect a fixation of the beam relative to the junction node. Despite the major effort and expense of producing the junction node and the complicated construction of the clamping elements coupled to the clamping screw, the clamped junction node cannot be prevented from becoming loose, in the event that the stand is jarred or shaken.

In a structural part for frames and/or load-bearing constructions which is known from German Utility Model DE 88 11 309 U1, recesses of a cube-shaped node body are engaged by a connecting profile piece, which has an end remote from the node body that engages a beam constructed as a hollow profile. The connecting profile piece is screwed through a central bore to the node body, while a connecting screw oriented transversely to the axis is provided between the connecting profile piece and the beam. The mode of connection lacks effective bracing between the node body and the beam, and so that an unstable connection cannot be precluded.

A machine frame is also known from German Patent DE 849 499, in which hollow sheet-metal spacers are disposed between its stanchion elements. The spacers and the stanchions are penetrated by tie bolts. Neither a junction node nor a form-locking connection is provided.

SUMMARY OF THE INVENTION

It is accordingly an object of the invention to provide a stand for receiving machines and equipment, which overcomes the hereinafore-mentioned disadvantages of the heretofore-known devices of this general type and which makes do with a junction node of simple construction and nevertheless assures a reliable, stable connection.

With the foregoing and other objects in view there is provided, in accordance with the invention, a stand for receiving machines and equipment, comprising horizontally and vertically extending beams being constructed as hollow profile sections; cup-shaped junction nodes being disposed in a plurality of planes, each of the junction nodes having a given side facing a respective one of the beams and being form-lockingly connected with the respective beam; cylindrical pins being embedded or let into the junction nodes, each of the pins projecting from the given side of a respective one of the junction nodes by a predetermined amount and engaging in a corresponding recess formed in the respective beam; connecting rods each passing through a respective one of the beams and having an end with an end surface and a thread, the end surfaces of the connecting rods each being spaced apart from a respective one of the junction nodes defining a gap therebetween; and screw connections each being disposed between a respective one of the connecting rods and a respective one of the junction nodes.

The cup-shaped junction node which is produced, for instance, as a cast part, undergoes a plane-surface external machining and then is provided with only one central bore associated with the lateral and bottom surfaces, for the connecting rod and bores associated with those surfaces and the surface remote from the bottom, for the cylindrical pins, in order to attain the form-locking connection. Recesses need merely be made in the beams for the cylindrical pins. The task of the recesses may also be accomplished by the inner peripheral surface of the beam, which then is linearly contacted by the jacket surface of a cylindrical pin in order to assure the form-locking connection. The cup-shaped structure of the junction node assures problem-free access when the junction node is screwed together with the connecting rods, and the gap between the connecting rod and the junction node assures bracing between the beam and the junction node. The stand according to the invention offers excellent rigidification and a connection that is not vulnerable to loosening by itself, as well as time-saving assembly because of its construction.

In accordance with another feature of the invention, there is provided a spacer plate between the junction node and the beam oriented toward it, the spacer plate is provided with a central through bore and is penetrated by the centering pins; the connecting rod protrudes as far as inside the through bore of the spacer plate; and the spacer plate is equipped with means for securing rigs, equipment or structural parts of the stand.

As a result of the spacer plates, ah adaptation to the most varied kinds of rigs is possible. A steel plate inserted and secured to the spacer plates on one level of the stand may, for instance, serve to secure cylinders, stamping dies, or screw assemblies. A protective lining or control panels can likewise be screwed to the spacer plates. Aside from assuring the form lock and the load-bearing function for machines and equipment, the spacer plate also serves as an abutment in bracing the beams that are constructed as hollow profiles.

In accordance with a concomitant feature of the invention, if the stand is intended to have more than one horizontal level, then the screw penetrating the bottom of the junction node is a stay bolt having an end remote from the bottom which is joined to a connecting rod penetrating the vertical beam.

This gives the adjacent connecting rod for the vertical beam an anchoring point, so that the spacer plates can be fastened between the beam and the junction node by the screw passing through the bottom of the junction node of the next level.

Due to its increased rigidity, steel is preferably used as the material for the stand.

Other features which are considered as characteristic for the invention are set forth in the appended claims.

Although the invention is illustrated and described herein as embodied in a stand for receiving machines and equipment, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a fragmentary, elevational view taken in the direction of an arrow II of FIG. 1;

DESCRIPTION OF THE PREFERRED EMBODIMENTS

Figure 1:
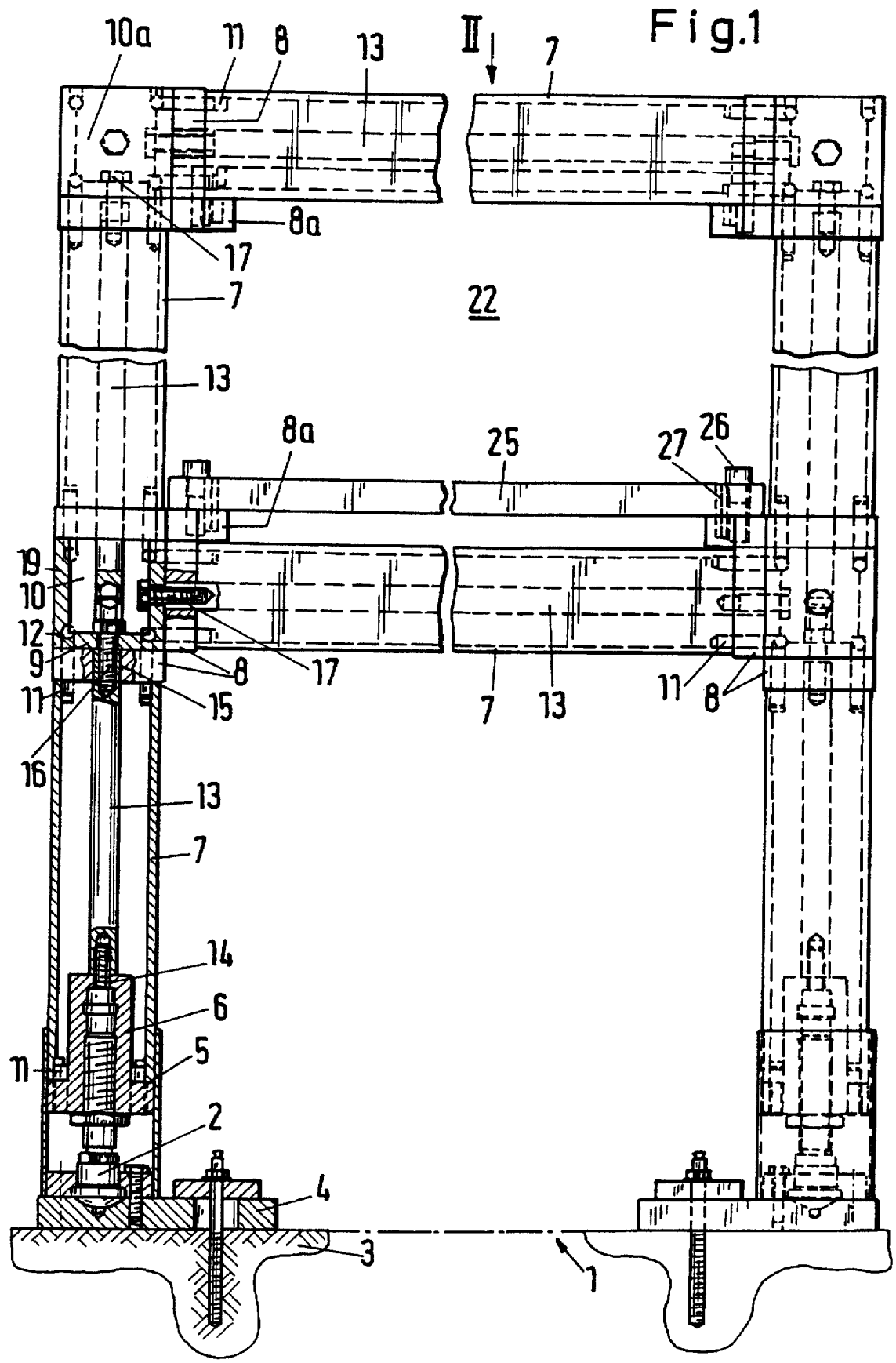
FIG. 1 is a diagrammatic, partly broken-away and partly sectional side-elevational view of a stand.

Referring now to the figures of the drawing in detail and first, particularly, to FIGS. 1 and 2 thereof, there is seen a portion of a stand or frame 1 that is supported by a foot 2 on a plate 4, which is detachably anchored to a floor 3. A vertically extending girder or beam 7, which is constructed as a rectangular tube, is supported on a shoulder 5 of a threaded sleeve 6 serving to adjust the foot. Cylindrical centering pins 11 which are let or embedded into the connecting sleeve 6 contact an inner peripheral surface of the beam 7. The cylindrical pins may also engage recesses formed in the beam 7. Hollow profiles other than a rectangular tube are also suitable for the beam.

An end of the beam 7 that faces away from the threaded sleeve 6 adjoins a spacer plate 8, which is disposed between the threaded sleeve 6 and a bottom 9 of a cup-shaped junction node 10. The spacer plate 8 is penetrated by four centering pins 11, which protrude past both end surfaces of the spacer plate by a predeterminable extent. The centering pins 11 have protruding portions which engage bores 12 formed in the junction node and contact the inner peripheral surface of the beam 7, thus creating a form-locking connection relative both to the beam 7 which is constructed as a rectangular tube and to the junction node 10. The rectangular tube is then preferably rounded on its corners. This form-locking connection is secured in position by a connecting or tension rod 13, which is carried through the beam 7 and is provided with an internal thread on both upper and lower ends thereof. Through the use of the internal thread on its lower end, the connecting rod 13 is joined to a threaded bolt 14 of the foot 2. The upper end of the connecting rod protrudes into a through bore 15 in the spacer plate 8 and is braced by a stay bolt 16 extending through the bottom 9 of the junction node 10, through contact of a hexagonal flush surface thereof with the inside of the bottom 9.

Figure 3:
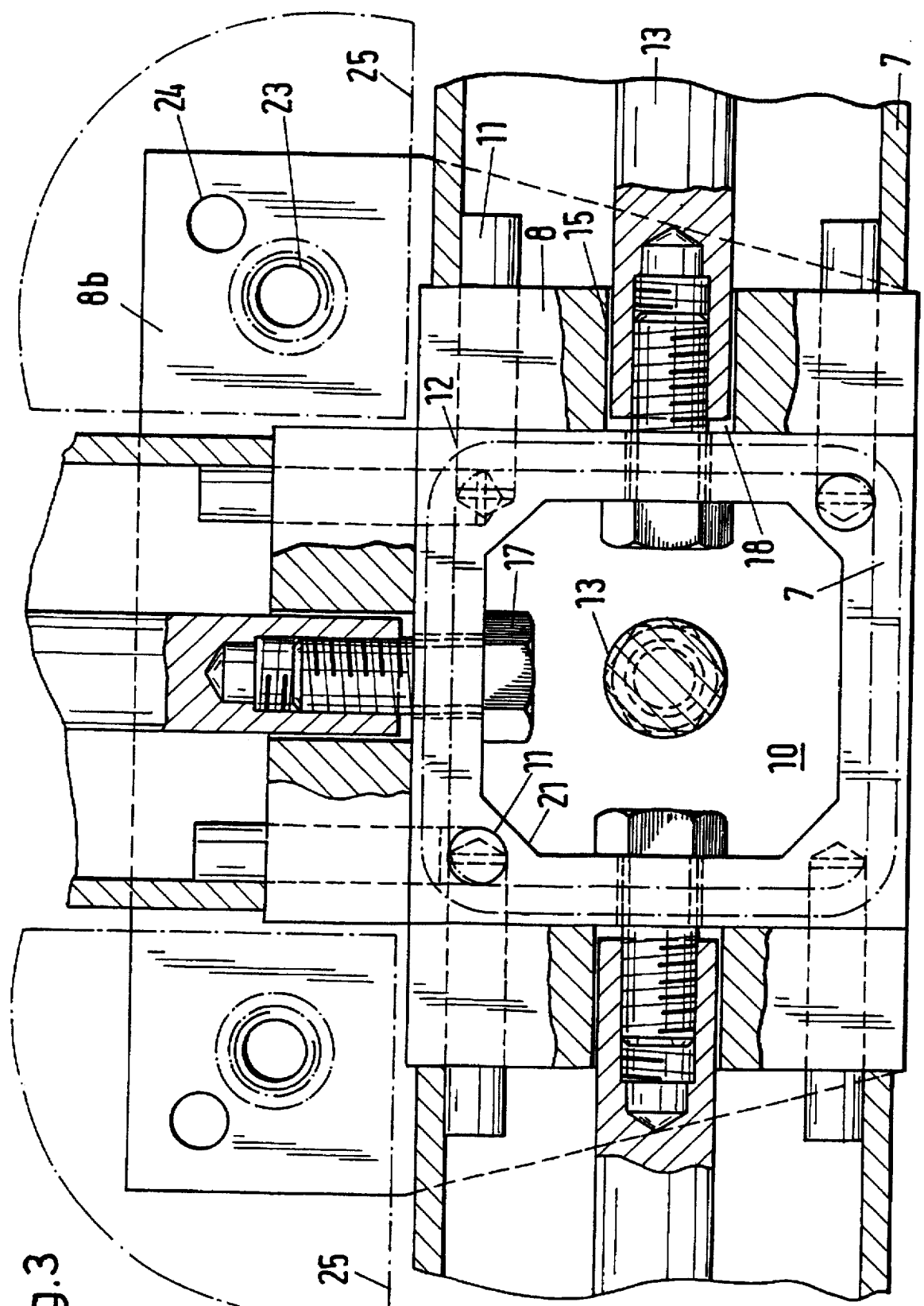
FIG. 3 is an enlarged, fragmentary, partly broken-away, sectional view of the region of a junction node.

As can be clearly seen in combination with FIG. 3, which shows one junction node 10 and three beams 7 extending horizontally away from it on a larger scale, a screw 17 serves to brace the connecting rod 13 for the beams leading laterally away. FIG. 3 also shows a gap 18 between an outer wall surface of the junction node 10 and an end surface of the connecting rod 13. This gap is absolutely necessary so that a force-locking contact will be attained between the spacer plate and the junction node or the beam. The form-locking connection is attained in the beams 7 extending horizontally away and having a spacer plate 8, in the same way as with the beams extending vertically away from the junction node.

The cup-shaped junction node 10, which is upright in FIG. 1, has side walls 19 leading away from its bottom 9. End surfaces of these side walls are supported on the spacer plate 8. The outer contour of a junction node, which is adapted to the rectangular tube, can be seen from FIGS. 2 and 3. It can also be seen from FIGS. 2 and 3 that the junction node is reinforced in its corner regions by a rounded portion 20 seen in FIG. 2 or a bevel 21 seen in FIG. 3. A spacer plate 8a, like the spacer plate 8, is penetrated by cylindrical pins 11, which engage bores 12 in the junction node 10 and contact the inner peripheral surface of the rectangular tube, as is indicated by dashed lines in FIG. 3, so that the aforementioned form-locking connection is brought about.

In FIG. 1, a connecting rod 13, which extends from the junction node 10 of a first level to a junction node 10a of a second level, is screwed to an upwardly-protruding threaded portion of the stay bolt 16 until it contacts a hexagonal end surface of the stay bolt 16, which end surface faces away from the bottom 9 of the junction node 10. The connecting rod 13 is carried through a through bore 15 in the spacer plate 8a and the beam 7 and protrudes into a through bore 15 in a spacer plate 8a associated with the second level. The gap 18 shown in FIG. 3 remains between the bottom 9 of the junction node 10a and the end surface of the connecting rod 13. In the illustrated exemplary embodiment, the second level simultaneously illustrates the first level, so that a screw 17 is inserted at the bottom 9 of the junction node 10a, in order to brace the connecting rod 13. If a third stand level should be necessary, then the screw 17 should be replaced with a stay bolt 16. The beams 7 extending horizontally away in the second or a possible further stand level are fixed relative to the junction node in the same way as the beams of the first level and as described in conjunction with FIG. 3.

Regions of the spacer plate 8a protruding into an interior 22 of the stand are provided with a threaded bore 23 and a receiving bore 24, which serve to lock a plate 25, with the aid of a cylinder-head screw 26 and a pin connection 27. Non-illustrated machines and equipment can be installed on the plate 25. Such machines and equipment, as well as other structural stand parts, can also be secured directly to the spacer plates, if the plate 25 is omitted.

In FIG. 3, a spacer plate 8b is shown, which is equipped with two portions that protrude into different zones of the stand and thus serve to lock two different plates 25. As is suggested by the contour of the spacer plate 8b which is shown partly in dashed lines, this spacer plate is disposed below the beam 7 leading laterally away. FIG. 3 shows the versatility of the form-locking and force-locking node junction. In the case of the three beams leading horizontally away, the drawing suggests that variant stands are possible that have up to six beams leading away from one junction node.

Figure 4:
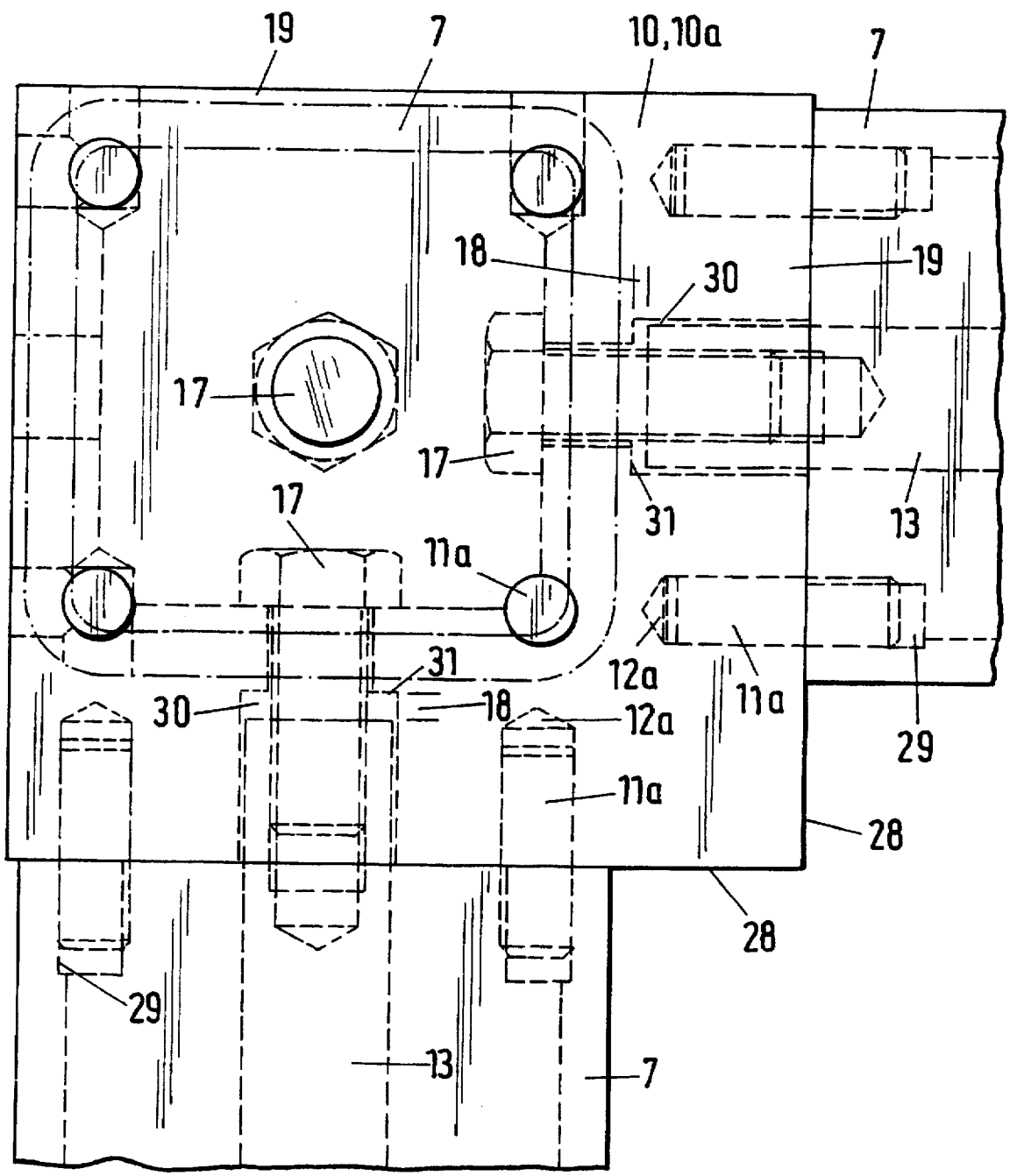
FIG. 4 is a fragmentary view of a portion of another embodiment of a stand.

In the stand embodiment of FIG. 4, the beams 7 are directly adjacent the junction nodes 10, 10a, in other words without the interposition of a spacer plate. In order to attain the form-locking connection, cylindrical pins 11a are locked in bores 12a in the junction node 10, 10a. The side walls of the cup-shaped connecting node 10, 10a may be constructed to be variously thick in this exemplary embodiment, so that the thicker side walls then receive the centering pins 11a. These cylindrical pins have portions that protrude beyond one lateral surface 28 and engage recesses 29 in the beam 7 in a form-locking manner. These recesses are preferably made in the corner regions of the beam which is constructed as a hollow profile. The connecting rod 13 that penetrates the beam 7 protrudes into a stepped bore 30 of the junction node and is braced against the lateral surface 28 with the screw 17 until it contacts the beam 7. A remaining gap 18 between a shoulder 31 at the stepped bore 30 and the connecting rod 13 guarantees a stable stand construction, resulting from the combination of a form-locking and force-locking connection.

In order to attain adequate stiffness, the structural parts of the stand are preferably made of steel.

I claim:

1. A stand for receiving machines and equipment, comprising:

horizontally and vertically extending beams being constructed as hollow profile sections;

cup-shaped junction nodes being disposed in a plurality of planes, each of said junction nodes having a given side facing a respective one of said beams and being form-lockingly connected with said respective beam;

said form locking connection including cylindrical pins being embedded into said junction nodes, each of said pins projecting from said given side of a respective one of said junction nodes by a predetermined amount and engaging in a corresponding recess formed in said respective beam;

connecting rods each passing through a respective one of said beams and having an end with an end surface and a thread, said end surfaces of said connecting rods each being spaced apart from a respective one of said junction nodes defining a gap therebetween; and screw connections each being disposed between a respective one of said connecting rods and a respective one of said junction nodes.

2. The stand according to claim 1, including spacer plates each being disposed between a respective one of said junction nodes and a respective one of said beams facing toward said respective junction node, said spacer plates each having a central through bore formed therein being penetrated by a respective one of said cylindrical pins; said connecting rods each protruding as far as inside a respective one of said through bores; and said spacer plates having means for securing rigs, equipment or structural parts of the stand.

3. The stand according to claim 1, wherein said junction nodes have bottoms, said screw connections are stay bolts each penetrating said bottom of a respective one of said junction nodes, and said stay bolts each have an end facing away from said bottom being joined to a respective one of said connecting rods.

4. The stand according to claim 2, wherein said junction nodes have bottoms, said screw connections are stay bolts each penetrating said bottom of a respective one of said junction nodes, and said stay bolts each have an end facing away from said bottom being joined to a respective one of said connecting rods.

* * * * *